United States Patent
Naumov et al.

(10) Patent No.: US 7,865,311 B2
(45) Date of Patent: Jan. 4, 2011

(54) METHOD FOR DETERMINING TRUE MERIDIAN AND DEVICE FOR ITS IMPLEMENTATION

(75) Inventors: Michael Naumov, 3 Hazor Street, Tel Aviv (IL) 69016; George Naumov, 3 Hazor Street, Tel Aviv (IL) 69016

(73) Assignees: Michael Naumov, Tel Aviv (IL); George Naumov, Tel Aviv (IL)

( * ) Notice: Subject to any disclaimer, the term of this patent is extended or adjusted under 35 U.S.C. 154(b) by 218 days.

(21) Appl. No.: 11/975,686

(22) Filed: Oct. 22, 2007

(65) Prior Publication Data

US 2009/0076729 A1    Mar. 19, 2009

(51) Int. Cl.
*G01C 21/10* (2006.01)
(52) U.S. Cl. .............. 702/2; 702/142; 702/145; 702/150; 73/514.09; 73/514.03; 73/488; 73/1.75; 33/366.15; 33/366.21; 33/324; 114/122; 114/125; 114/126; 114/283; 114/61.12
(58) Field of Classification Search .............. 702/2, 702/150, 96, 98, 145, 142; 73/514.02, 514.05, 73/514.09, 514.13, 514.11, 504.03, 1.75, 73/488, 861.44, 861.45, 861.42, 861.47; 33/366.15, 366.19, 366.21
See application file for complete search history.

(56) References Cited

U.S. PATENT DOCUMENTS

| | | | | |
|---|---|---|---|---|
| 4,095,547 A | * | 6/1978 | Benington | ............. 114/122 |
| 5,351,539 A | * | 10/1994 | Ziegenbein et al. | ........... 73/500 |
| 6,453,745 B1 | * | 9/2002 | Jalkanen | .......... 73/514.09 |
| 6,532,884 B2 | * | 3/2003 | Profitt et al. | ........... 114/61.12 |
| 6,851,317 B2 | * | 2/2005 | Naumov et al. | ......... 73/514.09 |
| 2002/0023579 A1 | * | 2/2002 | Profitt et al. | ........... 114/61.12 |
| 2003/0177830 A1 | * | 9/2003 | Naumov et al. | ......... 73/514.09 |
| 2007/0131028 A1 | * | 6/2007 | Naumov et al. | ............... 73/488 |
| 2008/0010843 A1 | * | 1/2008 | Naumov et al. | ............... 33/324 |
| 2009/0145223 A1 | * | 6/2009 | Naumov et al. | ......... 73/504.03 |

* cited by examiner

*Primary Examiner*—Carol S Tsai

(57) ABSTRACT

The present technical solution provided allows it to determine true meridian of any movable object. This solution is based on determining true meridian by zero value of linear acceleration induced created by changing the projection of the vector of linear velocity, caused by rotating any heavenly body, in particular, the terrestrial globe. The determination is implemented in compact variant only by the devices located on the movable object without any necessity of using induced radiations, quickly and accurately without any necessity of knowing the coordinates of location and the speed of movement irrespective of weather conditions, transverse accelerations, temperature changes and external magnetic fields influence.

8 Claims, 1 Drawing Sheet

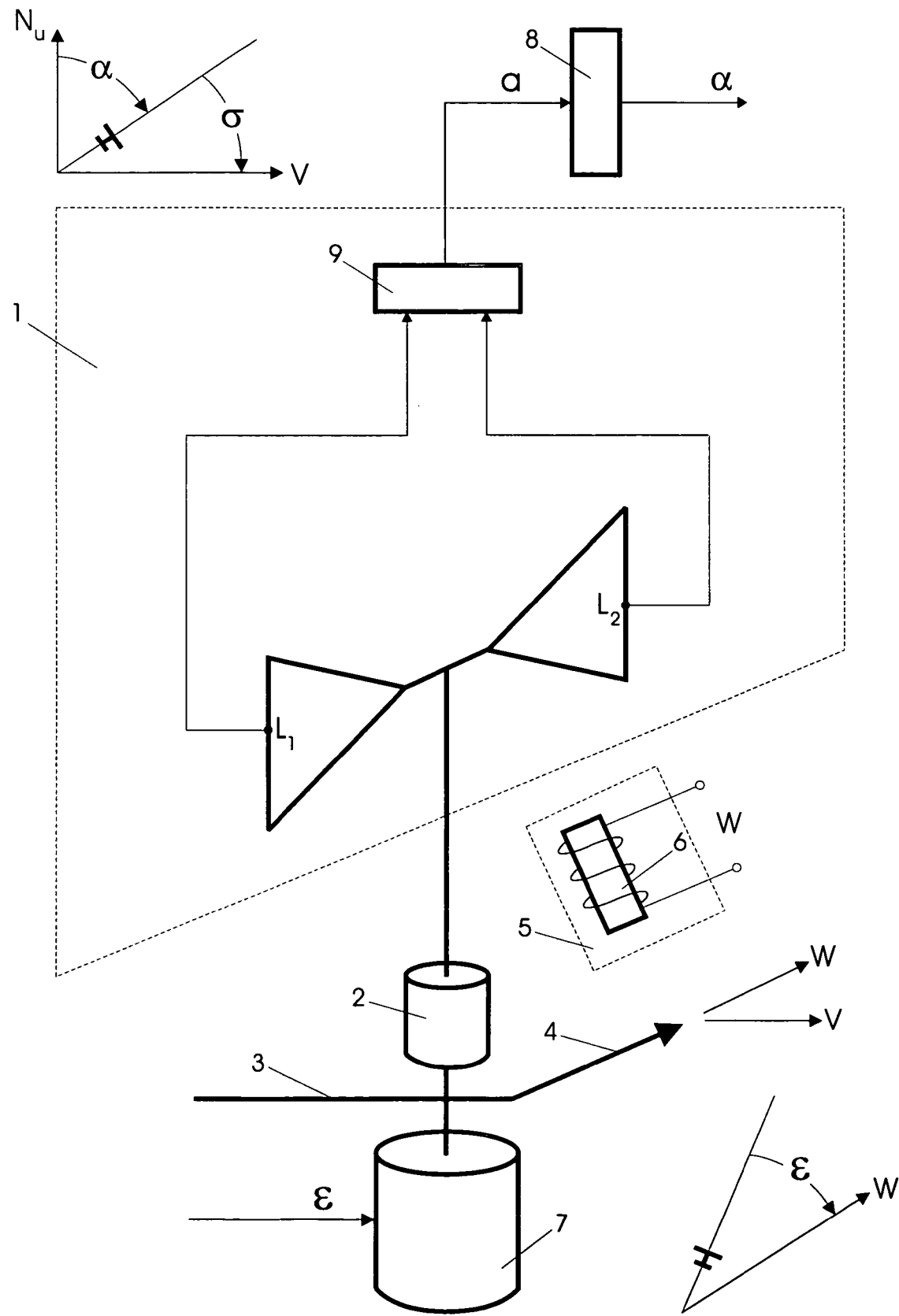

METHOD FOR DETERMINING TRUE MERIDIAN AND DEVICE FOR ITS IMPLEMENTATION

FIELD OF ART

The technical solution provided can be used for navigational, piloting and other purposes.

BACKGROUND OF THE INVENTION

True meridian is considered to be the arc of a great circle of the points of the surface of the heavenly body, the Earth in particular, equal to the geographical longitude. In the horizontal plane true meridian in navigation is the tangent to said arc. In the present application, under true meridian the said tangent is meant as well.

For determining true meridian use is made of different methods: magnetic, astronomic, and gyroscopic.

The main remarkable drawbacks of the magnetic method are as follows:
impossibility of using it in the higher polar latitudes because of the small value of the horizontal component of the magnetic Earth field;
with acceleration there occur un permissibly major errors and therefore this method is used in hybrid compasses: gyro magnetic and gyro inductive, they containing not only magnetic course sensors but also gyroscopes;
impossibility of using on the rotating heavenly bodies not having magnetic field.

The main remarkable drawbacks of the astronomic method are as follows:
impossibility of using when heavenly bodies being invisible (depending on weather conditions);
necessity of knowing the coordinates of the location and the time of the course determining;
necessity of determining bearing of the heavenly body by means of the astronomy year book.

This method is implemented by the astrocompasses.

The main remarkable drawbacks of the gyroscopic method are as follows:
impossibility of using in the higher polar latitudes because of the small value of the horizontal component of the angular velocity of the Earth rotation;
long duration for operation readiness (being up to dozens of minutes);
it is required to know the location coordinates, particularly, geographical latitude;
necessity of using the gyroscope;
big sizes, big weight and high cost;
impossibility of using on the aircrafts because of their high manoeuvrability and lower velocity of the precession of the gyroscope.

An object of the present technical solution is to provide quick and accurate determination of true meridian not only with immobile object but also with its moving irrespective of the disturbing factors influence, in particular, weather conditions, vibrations, transverse accelerations, external magnetic fields, without the necessity of knowing the location and without the necessity of using gyroscopes.

SUMMARY OF THE INVENTION

For achieving said goal there is a method provided based on fixing of the linear speed vector V caused by the heavenly body rotation, particularly, of the terrestrial globe. This vector is perpendicular to true meridian. Thus, knowing the direction of said vector means knowing true meridian as well.

Said fixing is implemented by the linear acceleration equal to zero. Said linear acceleration is produced by the change (with rotating) of the vector V projection on the sensitivity axis of the device for measuring horizontal acceleration. Said axis is always horizontal and be located in the plane of determining pressure (the plane containing the pressure determination points).

Vessels of the device for measuring horizontal acceleration (to be more exact said points) are located symmetrically relative to the vertical and are rotated around this vertical.

Equality of said linear acceleration to zero is determined by zero pressure difference in said points.

Said points are located in the identical inner cavities of the vessels (the inner cavities whereof being filled with flowing medium) identically on the parallel straight lines.

Upper and lower points (positioned on said parallel straight lines) of the contours of said inner cavities of said vessels remain as such (upper and lower), irrespective of permissible tilting. Using said pressure determination points, upper and lower points, identity of said inner cavities of said vessels and using differential scheme to be implemented in the sensor for measuring horizontal acceleration avoids any harmful influence of the transverse accelerations: vertical (tilting as well) and transverse as well as vibrations, temperature changes and others.

In the technical solution proposed said vessels are fastened on the axle (shaft) of an electric motor (called as an acceleration electric motor), the axle (shaft) whereof being located along the vertical of the mobile object or along the vertical axis of said mobile object, in case its body is used as a horizontal platform. The acceleration electric motor is positioned on a horizontal platform.

With it, said parallel straight lines are parallel to said axle (shaft) of said acceleration electric motor, thus, the vertical as well.

Pressure signals in said points are supplied to said differential scheme of said sensor for measuring horizontal acceleration from the output thereof there is a signal taken of said linear acceleration.

With rotating of a rotor of said acceleration electric motor together therewith rotation is performed of the plane of determining pressure (the plane containing the pressure determination points) and the axis of sensitivity $\xi$ of the sensor for measuring horizontal acceleration. Said axis is always horizontal. In the reference position, the axis of sensitivity of the sensor for measuring horizontal acceleration (axis $\xi$) is being oriented in a plane passing through the vertical of the mobile object and a chosen line of the mobile object, in particular the longitudinal axis of the mobile object.

When said axis $\xi$ (as well the plane of determining pressure, wherein said axis is located) is superposed with rotating with said vector V (being perpendicular to true meridian), the projection of said vector on said axis $\xi$ is maximum and equal to the speed V.

When said axis $\xi$, with rotating, will turn out to be perpendicular to said vector V, i.e. directed along true meridian, the projection of said vector on said axis $\xi$ is equal to zero.

Changing said projection of said vector V means that with rotating said vessels of said sensor for measuring horizontal acceleration there occurs linear acceleration, the latter changing from 0 to maximum. Mentioned change occurs periodically (the period being)360°. Herewith, when said axis of sensitivity $\xi$ with rotating is superposed with said vector V, linear acceleration a being derivative V, is equal to zero (V=a=0) and, when being superposed with true meridian this acceleration is maximum.

Therefore, through fixing zero signal of said linear acceleration determination is made of the direction of said vector V, thus, true meridian being perpendicular to said vector is determined as well. With such fixing true meridian is directed along the perpendicular to the plane of determining pressure and said axis $\xi$. For fixing true meridian relative to some line of the mobile object in its initial position (before starting rotation by said acceleration electric motor) there is said plane of determining pressure superposed with said line (so is said axis of sensitivity $\xi$).

Further for more convenience and certainty, (distinctness) deviation of said plane of determining pressure (so is said axis of sensitivity $\xi$) will be determined relative to longitudinal axis of said mobile object.

Output signal of said sensor for measuring horizontal acceleration taken from its differential scheme (said signal is the difference of pressures by itself in the pressure determination points) does not depend on disturbance factors, particularly, on transverse accelerations (vertical and, thus, it doesn't depend on permissible tilting, and transverse), vibrations and temperature changes. Moreover, said signal does not depend on centripetal (centrifugal) accelerations occurring with rotating around each of three mutually perpendicular axes, since said points are located symmetrically relative to the vertical and identically on said parallel straight lines, they being parallel to said vertical and contained in the identical inner cavities of said vessels.

If determination of true meridian of the immobile object is required, then there is no any necessity in continuous rotation of said rotor of said acceleration electric motor together with the vessels of said device of horizontal acceleration. Herewith, it is enough to cease this rotation, when said plane of determining pressure (so is said axis of sensitivity $\xi$) is superposed with said vector V.

For that, use is made of a control circuit called discreet. Said scheme includes a switch-on/off button (a switch) with a spring, an electromagnet and a relay. With pushing said button said rotor of said acceleration electric motor starts rotating. Herewith, in conformity with the above said, there occurs changeable acceleration acting in said plane of determining pressure. Because of the above, said pressure in one point of determining pressure is increasing, and in another point of determining pressure, it is either decreasing or not to be changing, accordingly. Therefore, at the output of said differential scheme (at the output of said sensor for measuring horizontal acceleration) there occurs a signal which is supplied to said control circuit, particularly, to said relay. Said relay snaps into action (works), its contacts close and it is through them that power is supplied to said electromagnet called device electromagnet. Said device electromagnet holds said switch-on/off button in the on-position until said relay becomes de-energized, which will cause contact breaking thereof. Said electromagnet will be made dead and said switch button under the influence of its spring is expected to return to its initial position. Herewith, the electric circuit of said acceleration electric motor will be de-energized and its rotor will stop. For accelerating this said stopping it is desirable to provide said electric motor with some brake. With such stop, said plane of determining pressure will turn out to be superposed with said vector V, the latter being perpendicular to true meridian. It is with said vector that said axis of sensitivity $\xi$ of said sensor for measuring horizontal acceleration will turn out to be superposed, said axis being always horizontal within permissible tilting. (This axis is rotating together with said plane of determining pressure).

Herewith, if said axis of sensitivity is directed to the east from true meridian, then while crossing the line of superposition of said axis $\xi$ with the direction of said vector V the sign of linear acceleration V=a is expected to change from "+" to "−" (a >0 changes with said crossing to a <0). And vice versa, if with mentioned induced rotating said axis $\xi$ is directed to the west from true meridian, then while crossing the line of superposition of said axis $\xi$ with the direction opposite to the direction of said vector V the sign a changes from "−" to "+" (a <0 changes with said crossing to a >0). This opposite sequence of changing signs of acceleration enables one to have opportunity by means of a special discriminator to automatically eliminate possible error 180° in determining the east-west direction, and thus, the north-south direction as well. Moreover, in practice, without said discriminator such kind of error is expected to be eliminated by means of different known properties.

The device described enables it to determine automatically true meridian only in two cases: with immobile position of the mobile object or with moving along the parallel (with strict movement towards the east or west).

In general case, (with any other direction of movement) the plane of determining pressure as well as said axis of sensitivity $\xi$ are set in the device described in conformity with the direction of the resulting vector, it being itself a vector sum of the two vectors: said vector V and ground speed vector W (the speed relative to a heavenly body, the Earth, in particular).

The error occurring herewith (an angle between said vectors) can be considerable enough (within 360°). It should be noted that the error mentioned might be also using a gyrocompass. For its determining it is required to know the speed of sea craft movement and geographical latitude of its location.

The present application has for its purpose to automatically eliminate said error. Herewith, the solution of the problem of automatically determining true meridian while moving a mobile object at any speed without any necessity of knowing the latter and without any necessity of knowing its location is eliminated.

Herewith, true meridian is determined by perpendicular to the vector of linear speed V to be produced by rotating a heavenly body, the terrestrial globe, in particular.

For achieving the above, elimination is made of any harmful influence of the projection of said vector W by means of induced influence in the plane of determining pressure on the pressure determination points (pressure sensors), being opposite relative to the sign and equal relation to the value of the influence to be produced by changing vector W projection on said plane.

Such opposite and equal influence is expected to be implemented by means of artificially created magnetic field, magnetic induction thereof is perpendicular in the horizontal plane to said vector W, and its value is determined by the value of the speed W of the vector W.

For achieving this purpose, the device described previously is added by the electromagnet the winding thereof is fed by the signal (in the form of electric voltage) of the ground speed W. The core of said electromagnet is perpendicular in the horizontal plane to the direction of the vector W and is located on the horizontal platform. Herewith, said core is located symmetrically relative to the pressure determination points (at similar distances from each of sad points) in initial position.

The information regarding of the ground speed vector W can be obtained from the inertial navigation system (INS) or from the Doppler system.

It should be stressed that the authors managed to find the solution (by means of the two different methods) of determining vector W in a way of free running, without any kind of radiation (unlike the Doppler system), which makes such kind of solutions be absolutely disturbance-protected from an induced external disturbances and without using gyroscopes (unlike the INS). Herewith, the solutions mentioned are independent on any disturbance factors, in particular, transverse accelerations, vertical and centripetal (centrifugal) including, vibrations, temperature changes and others. The authors expect these solutions to be patented in the USA should there be the permit of the Patents Department of Israel.

The information regarding the vector W includes the value (module) of this speed W and the direction of said vector relative to some line of the mobile object, in particular, relative to its longitudinal axis.

The angle between said axis and said vector W (its direction) is designated through $\epsilon$. Let us call the device producing angle $\epsilon$ value as well as the value of ground speed W as a ground speed sensor (this sensor is not shown in the drawing).

The more the value W, the more the core of said electromagnet is magnetized.

In the device implementing the method proposed an electric motor is also introduced called a platform electric motor. Its axle (shaft) is located along the vertical or along the vertical axis of the mobile object, in case if the body of said object is used as the horizontal platform.

The platform electric motor is fixed on a platform stabilized in a horizontal plane, in particular, on the body of the mobile object, in case its body is used as a horizontal platform.

For achieving the above the body of the device provided is fastened on the horizontal platform or in the case mentioned, on the body of said mobile object.

Said axle (shaft) of said platform electric motor is firmly connected to said platform.

Said platform electric motor, receiving said signal of an angle $\epsilon$, is expected to turn said platform, including said electromagnet, and fixed said marked line thereon by said angle.

In the initial position said marked line is located along, particularly, longitudinal axis of said mobile object (or along the line parallel thereto). Therefore, said marked line means the direction of said vector W.

Thus, for corresponding influence of the magnetic field of said electromagnet on the sensitive elements of the pressure sensors there are the following measures provided:

- to the winding of said electromagnet there is electric voltage being a signal W by itself supplied;
- the core of said electromagnet is located in the horizontal plane perpendicular to said marked line (it means, to the direction of said vector W) and symmetrically relative to the vessels, to be more exact to the pressure determination points (at equal distances from each of them) in the initial position;
- as sensitive elements of said pressure sensors use can be made of resilient elements, some membranes from magnetic material, for example, or (and) with the coating from sad material;
  or (and)
- using magnetic liquid as flowing medium in the vessels of said sensor for measuring horizontal acceleration. In this case use can be made of said pressure sensors with said sensitive elements of different type.

Due to the above measures with rotating said rotor of said acceleration electric motor the influence (on the pressure determination points) of the changeable projection of the magnetic induction on the plane of determining pressure is the same as the influence of the changeable projection of said vector W on the same plane, but of the opposite sign. Therefore, any harmful influence of said vector W on the determination of true meridian is eliminated.

The device with the discreet control circuit considered above does not allow it to determine true meridian continuously (but just discreetly, at times).

For continuous determining true meridian, rotating said rotor of said acceleration electric motor takes place uninterruptedly.

Herewith, at the output of said sensor for measuring horizontal acceleration (at the output of its differential scheme 9) said signal is by itself a periodic curve (with period of 360°) of the dependence of said linear acceleration a on the angle of rotation of said axis of sensitivity $\xi$ relative to said longitudinal axis of the mobile object.

The direction of said vector V (said east west-direction) is determined by angle $\sigma$ between the beginning of said curve (longitudinal axis of the mobile object) and by its zero value, in which there takes place previously mentioned sequence of changing the positive sign to the negative one. This means that said angle $\sigma$ is the angle between said longitudinal axis of said mobile object and said vector V.

The true heading $\alpha$ which serves for determining the true meridian is easily determined according to angle $\sigma$.

Due to that the true heading signal represents the signal of true meridian position.

It should be kept in mind that said zero values of said curve determine the position of the geographical parallel.

The north-south direction of true meridian, in its turn, is determined by the perpendicular to the west-east direction (by the perpendicular to said vector V).

Therefore, continuous control circuit is a device transforming periodical electrical signal coming from said sensor for measuring horizontal acceleration to the graphical periodical image of the same kind. Said graphical image can, in particular, be reflected on the radar display computer.

By its zero value given to be counted off from the value of the corresponding to the longitudinal axis of the mobile object determination is made of true heading $\alpha$. Control scheme includes a scheme for presenting the image of a signal from the sensor for measuring horizontal acceleration on the screen, for example, radar. Under this heading we mean an angle between the northern direction of true meridian $N_u$ and said longitudinal axis of the mobile object.

For eliminating any harmful influence of external magnetic fields (the Earth, mobile object, etc.) said vessels of said device for measuring horizontal acceleration and said road electromagnet are provided with the screens (displays).

Since the speed of rotating said rotor of said acceleration electric motor is very high, the present technical solution can be used in higher polar latitudes even despite small values of the speed V in these latitudes.

BRIEF DESCRIPTION OF THE INVENTION

The present technical solution is illustrated by way of the drawing on which there is a structural (functional) scheme shown of the device for determining true meridian.

On said drawing there are not pressure sensors shown, but there are the points shown whereon pressures of these sensors are determined.

In addition, not to make said drawing more complex, there are not any electric connections of said pressure sensors shown with current-conducting rings. Said rings are connected with the axle (shaft) of said acceleration electric motor. They are sliding while rotating along the current-conducting electric brushes, from which the signals are supplied to the differential scheme. Said rings and electric brushes are not shown on said drawing either.

DETAILED DESCRIPTION OF THE INVENTION

The method provided is based on fixing the direction of said vector of linear speed produced by rotating a heavenly body, the terrestrial globe, in particular, by said linear acceleration to equal to zero, it being induced created by changing said projection of said vector on the plane, containing said pressure determination points symmetrically located relative to the vertical and induced rotation around it.

The equality of said linear acceleration being to zero is determined by zero difference of pressures in said points.

Said points are located identically in identical inner cavities of said vessels (filled with flowing medium) identically located on the parallel straight lines along the vertical.

On the drawing provided there is a structural (functional) scheme of one of possible devices shown, it implementing the method to be provided for determining true meridian of the mobile object.

Said device comprises interconnected between each other said sensor for measuring horizontal acceleration 1, said acceleration electric motor 2 the axis $2_A$ of which is positioned along the vertical, said platform 3 with said road line 4 drawn thereon, said electromagnet 5 with said core 6, said platform electric motor 7 the axis $7_A$ of which is positioned along the vertical, and said control circuit 8.

Said vessels of said sensor for measuring horizontal acceleration 1 are fastened on said axle (shaft) of said acceleration electric motor 2 in the way that said parallel straight lines, whereon said pressure determination points $L_1$ and $L_2$ as well as upper and lower points to be identically located are parallel to the axle (shaft) of said electric motor.

Said body of said platform electric motor is fastened on said platform 3 so that, in the horizontal position thereof, said axle (shaft) of said rotor of said acceleration electric motor be located along the vertical.

Said plane of determining pressure (containing said points of determining g pressure $L_1$ and $L_2$) of said sensor for measuring horizontal acceleration 1 in the initial position (before the beginning of the rotation) are located along some chosen line of the mobile object, particularly, for more convenience, along said longitudinal axis of said mobile object (or along the line parallel to it).

Said marked line 4 to have been drawn (on said platform 3) in the initial position is also set in this direction.

Said electromagnet 5 is fastened on said platform 3 so that said core 6 is located on said platform perpendicular to said marked line 4 and symmetrically relative to said points of determining $L_1$ and $L_2$ pressure in the initial position of said plane.

With said platform there is firmly connected said axle (shaft) of said platform electric motor 7 so that its axle (shaft) is located along the vertical.

If said body of said mobile object is used as a horizontal platform, then it can be used as a road platform.

For said electromagnet 5 to be able to influence said sensitive elements of said pressure sensors (meaning said pressure determination points $L_1$ and $L_2$) in the same way, in terms of the value as said vector W, but opposite by the sign, there are the following measure provided for:

electric voltage determined by the value of the speed W is supplied on the winding of said electromagnet 5;

said location of said core of said electromagnet mentioned above;

as sensitive elements of pressure sensors use can be of resilient elements, some membranes, for instance, from magnetic material or (and) with the coating from said material or (and)

using magnetic liquid as flowing medium in the vessels of the sensor for measuring horizontal acceleration 1. Using said magnetic liquid use can be made of said pressure sensors with sensitive elements of any type.

On winding of said electromagnet 5 there is said signal of said ground speed W supplied, and on said platform electric motor 7 there is said signal of angle ε supplied (ε—the angle between longitudinal axis of the mobile object and vector of ground speed W) from a ground speed sensor.

Said platform electric motor 7 receiving said signal of angle ε, is expected to rotate said platform 3 by said angle. Therefore, magnetic induction produced by said electromagnet 5 turns always out to be perpendicular to said vector W, and by the value is determined by the value W obtained from the ground speed sensor.

With rotating said vessels of said sensor for measuring horizontal acceleration (by means of said acceleration electric motor 2), the value of the projection on the pressure determination plane changes, both of said vector W and magnetic induction.

Due to said change of the projection of said vector W in said plane of determining pressure along said axis of sensitivity ξ of said sensor 1 there occurs said linear acceleration, it being considered to be harmful.

When with rotating said plane of determining pressure (said axis of sensitivity ξ) is perpendicular to said vector W, said projection on said plane will be equal to zero, and said linear acceleration will be maximum. Simultaneously, said projection of magnetic induction on said plane is expected to be maximum. And since the value of magnetic induction is determined by the signal W, then resulting influence of said projections is expected to be equal to zero. Thus, at the output of the differential scheme 8 (at the output of said sensor 1) no changes will occur. Thus, any harmful influence of said vector W will be eliminated.

When with rotating said plane of determining pressure (said axis of sensitivity ξ) is congruent with said vector W, its projection will be maximum, and said linear acceleration will be equal to zero. Simultaneously, since magnetic induction is perpendicular to said plane of determining pressure (axis of sensitivity ξ) and symmetrical relative to said points $L_1$ and $L_2$, then its influence is expected to be zero.

Thus, it means that in this case the influence of said vector W is also eliminated.

Since with rotating the vessels of said sensor 1 the projection of said vector W and magnetic induction change with rotating in the same way (in conformity with one and the law) and their influences are equal by the value and opposite by the sign, then it goes without saying that any harmful influence of said vector W is always eliminated.

At the same time, with rotating said vessels of said sensor 1 there occurs change of said projection on said plane (on said axis of sensitivity ξ) of said vector V of linear speed V caused by the rotation of a heavenly body, particularly, the terrestrial globe. Due to the above, in said plane there occurs linear acceleration determined by the difference of pressures in said points $L_1$ and $L_2$ determined by said pressure sensors.

When said plane (axis of sensitivity ξ) is congruent with said vector V, this acceleration a is equal to 0 (a=0). In this case, at the output of said sensor 1 the signal will be equal to 0.

By this zero signal determination is made of true meridian perpendicular to said vector V.

For fixing said zero signal (a=0) i.e. true meridian, said control circuit 8 serves, wherein a signal from said sensor 1 is supplied. Said circuit can be discreet and continuous.

In the discreet control circuit with a=0 the rotation of said rotor of said acceleration electric motor 2 stops, and said plane of determining pressure, said axis of sensitivity ξ and road 4 turn out to be superposed with said vector V i.e. perpendicular to true meridian.

Herewith, the perpendicular to said plane (as well as to the axis ξ) containing said pressure determination points indicates true meridian.

In the continuous control circuit the rotation of said acceleration electric motor 2 occurs uninterruptedly. Therefore, the output signal of said sensor 1 is of periodical character (with the period of 360°).

In the initial position (before rotating) said plane of determining pressure, i.e. said plane containing said pressure determination points, is set in the direction of the line of the mobile object chosen, particularly, of its longitudinal axis.

Therefore, with rotating, the beginning of the curve of said signal corresponds to the initial position of said plane (axis of sensitivity ξ), i.e. its longitudinal axis of the mobile object.

Due to the above, the angle counted off from the beginning of said curve till its zero value determines the position of the geographical parallel.

In its turn, zero value of said curve, wherein there occurs the change of its positive value for the negative one determines the direction of said vector V (west-east).

Thus, the angle counted off from the beginning of said curve till said zero value is the angle σ between said longitudinal axis of the mobile object and vector V.

In said continuous control circuit 8 the determination of said angle σ takes place.

This enables it to give off the data about true meridian by means of giving off the signal of true heading α, graphical image of said curve or flash (stray lighting) on the radar screens (displays), computer, electron-ray tube.

Thus, the operation of the device provided is tracing (by the angle ε) the direction said vector V and determining true meridian by zero signal of linear acceleration, in particular, by determining true heading α.

Since said operation is not connected with the usage of magnetic field of a heavenly body, particularly, the terrestrial globe, then elimination of its harmful influence as well as magnetic field of the mobile object is implemented by means screening.

The most distinguishing feature of the technical solution provided is a new solution for determining true meridian.

The platform electric motor 7 can be fixed on a platform 10 stabilized in a horizontal plane, in particular on a mobile object body in case this body is used as such a platform.

The main considerable advantages and merits of the technical solution provided are:
  determining of true meridian is implemented absolutely autonomously, i.e. only by the means (devices) located on the mobile object without any radiations;
  knowing the location coordinates is not required;
  using magnetic field of a heavenly body is not required, thus, there is an opportunity of using it on any heavenly body to be rotating;
using gyroscopes is not required;
independence of said operation on transverse accelerations, including the vertical one;
independence of said operation on weather conditions;
independence of said operation on said vector of the movement velocity of the mobile object;
the opportunity of using in higher polar latitudes;
complete disturbance-protection from external interferences,
disturbances;
quick readiness for the operation;
quick and precise determination of true meridian;
the opportunity of using on any vehicles, including aircrafts.

The authors have found the solution (patent application Ser. No. 12/006,728) of eliminating any harmful influence of centrifugal (centripetal) accelerations occurring with rotating of the mobile object around instantaneous center of rotation, irrespective of its position. Due to that the device according to patent application Ser. No. 12/006,728 can be used as a device for measuring horizontal acceleration.

Devices presented in patent application Ser. Nos. 12/077,865 and 12/218,186 can be used as ground speed sensors.

Notes

1. In case of necessity, use can be made of amplifiers, correcting units (damping and others), as well as transformation can be made of alternating current into direct current, and vice versa.

2. We are applying to you with request to give the names below to the inventions provided:
  "Naumov, Method for determining true meridian",
  "Naumov, Device for determining true meridian",

We claim:

1. A method for determining true meridian comprising the following stages:
  rotating vessels making part of a sensor for measuring horizontal acceleration by means of, for example, an electric motor, around the vertical of a mobile object, the said vessels comprising pressure determination points which being positioned symmetrically relative to the vertical mentioned,
  determining a ground speed vector of the mobile object by any of the known ways,
  determining accelerations by the said sensor for measuring horizontal acceleration along its axis of sensitivity, the accelerations which being produced due to changes in the projection of the ground speed vector of the mobile object on the axis of sensitivity and due to changes in the projection of a linear speed vector of the mobile object on the said axis of sensitivity, the said linear speed being caused by the rotation of a heavenly body, more specifically the terrestrial globe,
  creating counteraction along the said axis of sensitivity, equal by module and oppositely directed to action which produced by the varying projection of the ground speed vector of the mobile object,
  determining the direction of the linear speed vector by a zero signal of the varying linear acceleration which being produced due to change in the said projection of the linear speed vector on the said axis of sensitivity of the sensor for measuring horizontal acceleration, determining a true heading of the mobile object, autonomous determining a true meridian of the mobile object by an electric motor in accordance with the said true heading of the mobile object.

2. The method according to claim 1, wherein said counteraction being implemented by means of magnetic field, magnetic induction thereof being perpendicular to the vector of ground speed, and the module of said magnetic induction is determined by the value of said ground speed.

3. The method according to claim 2, wherein in the initial position the said axis of sensitivity of the sensor for measuring horizontal acceleration being oriented in a plane which passing through the vertical of the mobile object and any chosen line of the mobile object, more specifically its longitudinal axis.

4. The method according to claim 3, wherein the direction of the vector of said linear speed being determined by the angle counted on the curve of said linear acceleration from the start of the curve to its zero value wherein said linear acceleration changes its sign from positive to negative.

5. A device for determining true meridian, located on a mobile object and comprising the following parts interconnected with each other:

a platform electric motor being located on the mobile object, a platform to which an axle of said platform electric motor being connected, an acceleration electric motor being located on the platform, a sensor for measuring horizontal acceleration, vessels thereof being connected to the axle of said acceleration electric motor, and the pressure determination points of said sensor for measuring horizontal acceleration being located symmetrically relative to the axle of said acceleration electric motor, an electromagnet being located on said platform, a ground speed sensor connected to said platform electric motor and said electromagnet, a control circuit generating information on true meridian in the form of true heading of the mobile object and connected to the sensor for measuring horizontal acceleration.

6. The device according to claim 5, wherein the axles of said electric motors being located along the vertical, more specifically along the vertical axis of the mobile object in case its body is used as a horizontal platform.

7. The device according to claim 6, wherein said vessels, electromagnet and platform electric motor being provided with screens against influence of external magnetic fields.

8. The device according to claim 7, wherein a core of the electromagnet being positioned on the platform perpendicularly to a marked line drawn on said platform, the core of the electromagnet being located in equal distances from said vessels when the sensor for measuring horizontal acceleration is in its initial position, the marked line simulating the direction of a ground speed vector.

* * * * *